(12) United States Patent  
Getman

(10) Patent No.: US 8,752,304 B2
(45) Date of Patent: Jun. 17, 2014

(54) SYSTEM AND METHOD FOR DUPLICATING ANGLES IN NATURE

(76) Inventor: James Rodney Getman, Amarillo, TX (US)

( * ) Notice: Subject to any disclaimer, the term of this patent is extended or adjusted under 35 U.S.C. 154(b) by 341 days.

(21) Appl. No.: 13/292,519

(22) Filed: Nov. 9, 2011

(65) Prior Publication Data

US 2013/0111769 A1    May 9, 2013

(51) Int. Cl.
    *G01C 1/00*     (2006.01)
(52) U.S. Cl.
    USPC ............................................. 33/280; 33/276
(58) Field of Classification Search
    USPC .................................................. 33/276–280
    See application file for complete search history.

(56) References Cited

U.S. PATENT DOCUMENTS

| 3,925,899 | A | * | 12/1975 | Hesse et al. | ..................... | 33/403 |
| 4,245,393 | A | * | 1/1981 | Zane et al. | ..................... | 33/276 |
| 4,625,409 | A | * | 12/1986 | Arakawa | ........................ | 33/471 |
| 5,488,777 | A | * | 2/1996 | Erdesky | ......................... | 33/280 |
| 7,178,256 | B2 | * | 2/2007 | Roche | ............................. | 33/653 |
| 2013/0111769 | A1 | * | 5/2013 | Getman | ........................ | 33/280 |

* cited by examiner

*Primary Examiner* — Yaritza Guadalupe-McCall
(74) *Attorney, Agent, or Firm* — Shannon L Warren

(57) ABSTRACT

An angle finder method is disclosed. Said angle finder method comprises aligning a cross-point of a plurality of adjustable reticles with a vertex of an angle in an object, rotating said adjustable reticles from an initial angle to an aligned angle matching said angle in said object, and transferring said aligned angle to a transfer medium. Wherein, said plurality of adjustable reticles are held within a view window and an angle finder comprises said view window and said adjustable reticles.

20 Claims, 12 Drawing Sheets

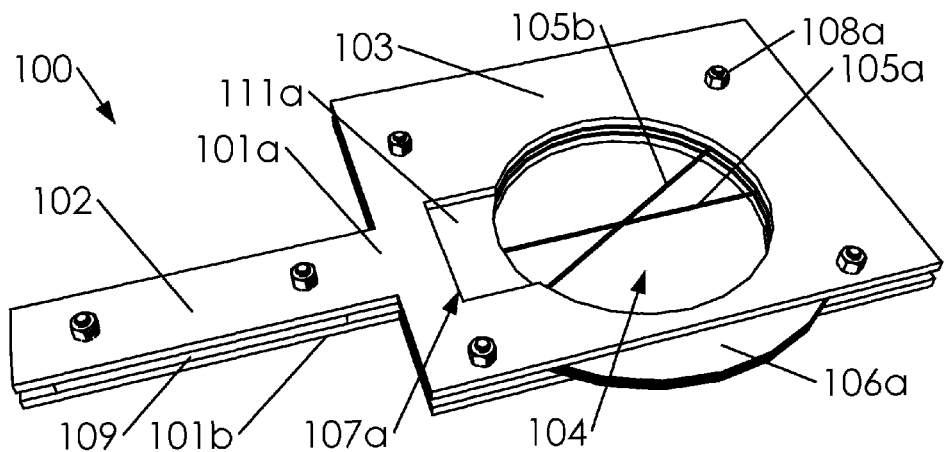
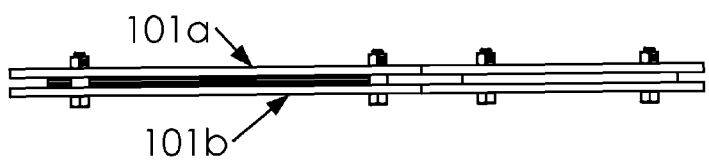
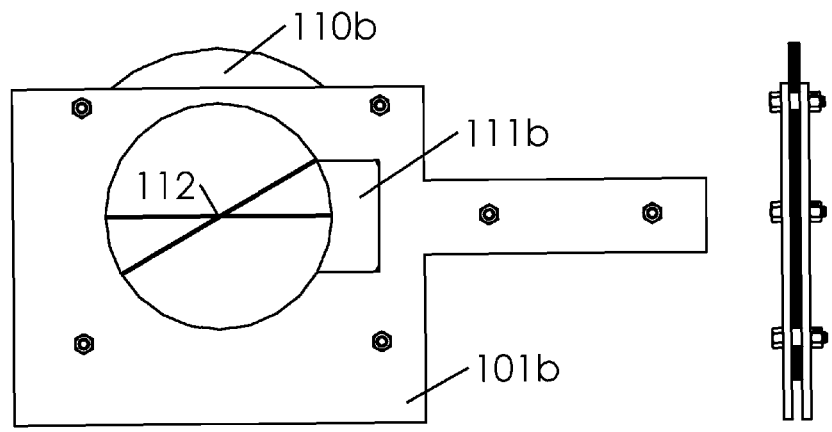
Fig. 1A
Fig. 1B
Fig. 1C    Fig. 1D

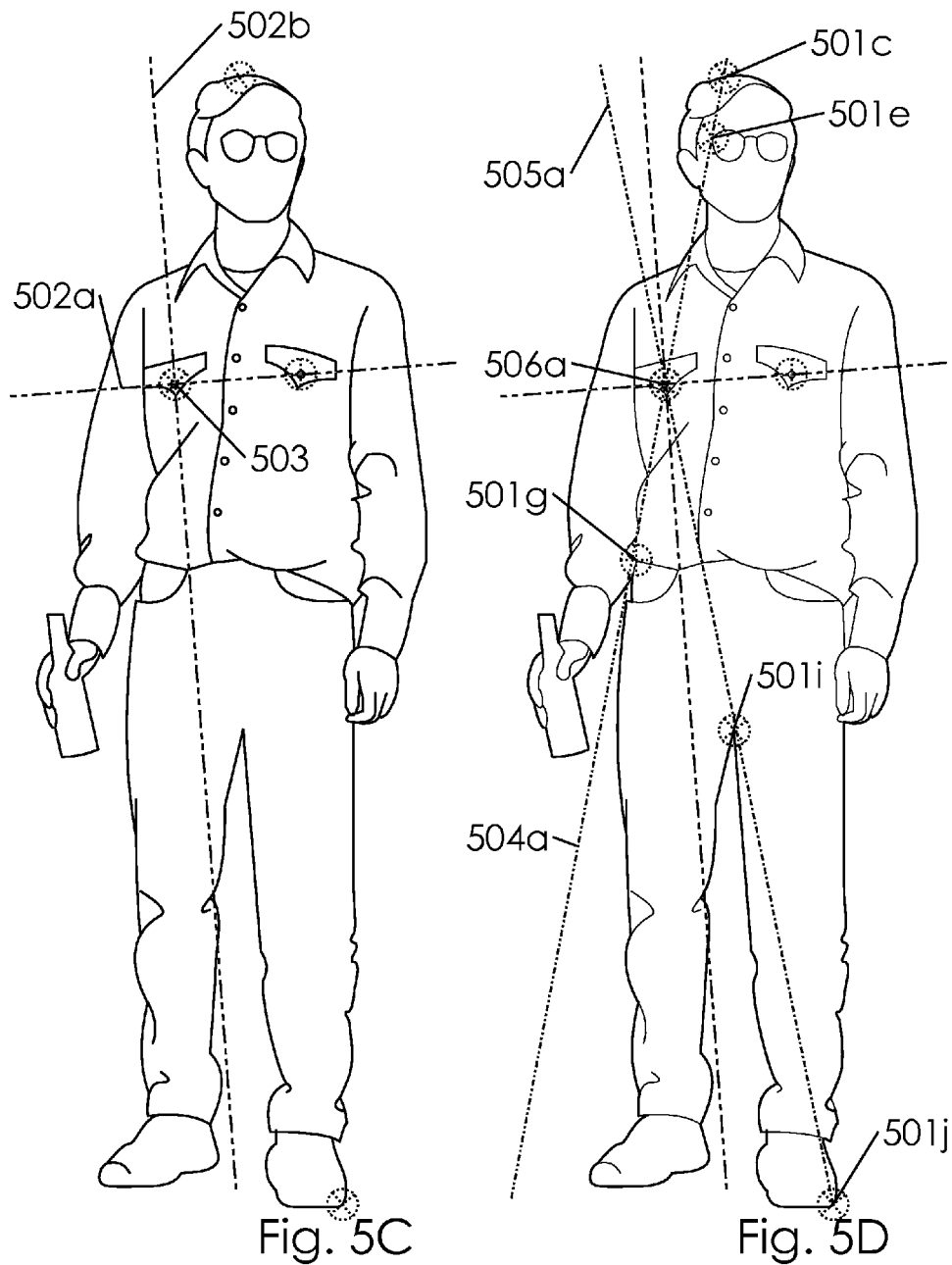

SYSTEM AND METHOD FOR DUPLICATING ANGLES IN NATURE

BACKGROUND

This disclosure relates generally to a system and method for duplicating angles in nature.

The act of duplicating angles and proportions in nature is an important task for painters, artists, and architects, among others. For example, whether a painting is considered a likeness of an object or an amateur rendering of said object may be determined by how accurately a painter can reproduce the angles and proportions of said object in a painting.

Historically, artists are known to hold their arm out and measure angles by twisting their thumb or paint brush between a range of positions so as to get a feel for how said object should be painted. This approach has many flaws, for sure. Most notably, is inaccuracy of reproducing said angles on a canvas. The general imprecision has led to many poorly rendered paintings.

In U.S. Pat. No. 4,625,409, Mr. Arakawa discloses a device for use on a computer display screen to determine direction changes for graphics commands. Said device comprises a circular ring bearing indicia representing degrees around the circumference of said ring relative to a point of origin on said ring, first and second members rotatable within said ring and through which at least a portion of the computer display is visible, each of said first and second members having a straight line movable into and out of registration with the straight line on the other of said first and second members by rotation of said first and second members within said ring, said first and second members bearing indicia along the straight line corresponding to a graphics symbol centrally located of said ring, said first and second members having contrasting colors and being configured so that each forms a semicircular area in one of the contrasting colors within said ring. Arakawa, however, leave much to be desired. Not least because Arakawa disclosed a device for use on a computer display for to determine direction changes for graphics commands. Such a limitation to computer screens would not be well suited to use by painters and the like. Although Arakawa could be used in other circumstances by non-computer users, it is clear that his disclosed device is best suited for computer graphics displays. First, Arakawa does not disclose a handle for use by a painter. Neither does it disclose a means for one handed use. Further, Arakawa's design requires a pair of translucent rings which would likely produce distracting glare if used apart from a back lit computer screen which compensates for glare by shining through the device. Also notable is the presence of numbers and icons upon the surface of said device which would interfere with operation of said device by users less concerned with numerical measurements of angles and proportions and more concerned with matching said angles and proportions for reproduction elsewhere.

In U.S. Pat. No. 3,925,899, Ms. Hesse discloses a graphics instrument. Said instrument is disclosed for drawing and measuring. Said instrument includes a pair of coplanar scale members mounted for concentric mutual rotation. A circular graduated scale on the outer member displays angular degree and radian values, and this scale is in register with a circular graduated scale on the inner member which displays both angular and trigonometric function values. Straight edges are formed to extend along axes of each scale member to facilitate measurement and drawing by a marking instrument. Although useful as a drawing instrument Hesse does not disclose a tool useful for quickly and accurately measuring angles and proportions in nature. Like Arakawa, Hesse is more useful for determining a numerical representation of angles due to Hesse's linear and angular measurement scales marked on its members. Hesse however, goes further than Arakawa and discloses additional functionality; namely, the drawing of a vertex of an angle, drawing an arch, and similar paper and pencil activities. Nonetheless, Hesse does not disclose a tool useful for assessing angles and proportions of an object in nature and, further, useful for reproducing said angles and proportions on a transfer medium (such as a painting).

None of the above inventions and patents, taken either singularly or in combination, is seen to describe the instant disclosure as claimed. Accordingly, an improved system and method for duplicating angles in nature would be advantageous.

SUMMARY

A systems and a method for duplicating angles and proportions in nature are disclosed. First, an angle finder method is disclosed. Said angle finder method comprises aligning a cross-point of a plurality of adjustable reticles with a vertex of an angle in an object, rotating said adjustable reticles from an initial angle to an aligned angle matching said angle in said object, and transferring said aligned angle to a transfer medium. Wherein, said plurality of adjustable reticles are held within a view window and an angle finder comprises said view window and said adjustable reticles. Next, another embodiment of an angle finder is disclosed. Said angle finder comprises a view window and a plurality of adjustable reticles. Said plurality of adjustable reticles comprise a cross-point at their intersection with one another in said view window, and a plurality of angles originating at said cross-point and bound by said adjustable reticles. Said adjustable reticles rotate within said view window to alter said plurality of angles from an initial angle to an aligned angle. An angle in an object comprises a vertex, a first line and a second line. Said angle finder can match said angle in said object by aligning said cross-point of said adjustable reticles with said vertex of said angle in said object, rotating said adjustable reticles from said initial angle to said aligned angle matching said angle in said object, and measuring said angle in said object.

BRIEF DESCRIPTION OF THE DRAWINGS

FIGS. 1A, 1B, 1C and 1D illustrate an overview, a side view, a back view and an end view of angle finder.

FIGS. 5A through 5F illustrate angle finder in use as a proportion finder.

FIG. 5A illustrates subject.

FIG. 5B illustrates points on subject.

FIG. 5C illustrates a horizontal plum line and a vertical plum line.

FIG. 5D illustrates subject with a first line and a second line about a first vertex.

FIG. 5E illustrates subject with a plurality of lines for finding said relative distance between points.

FIG. 5F illustrates a view of said plurality of lines for finding said relative distance between said points within subject.

DETAILED DESCRIPTION

Figure 2A:
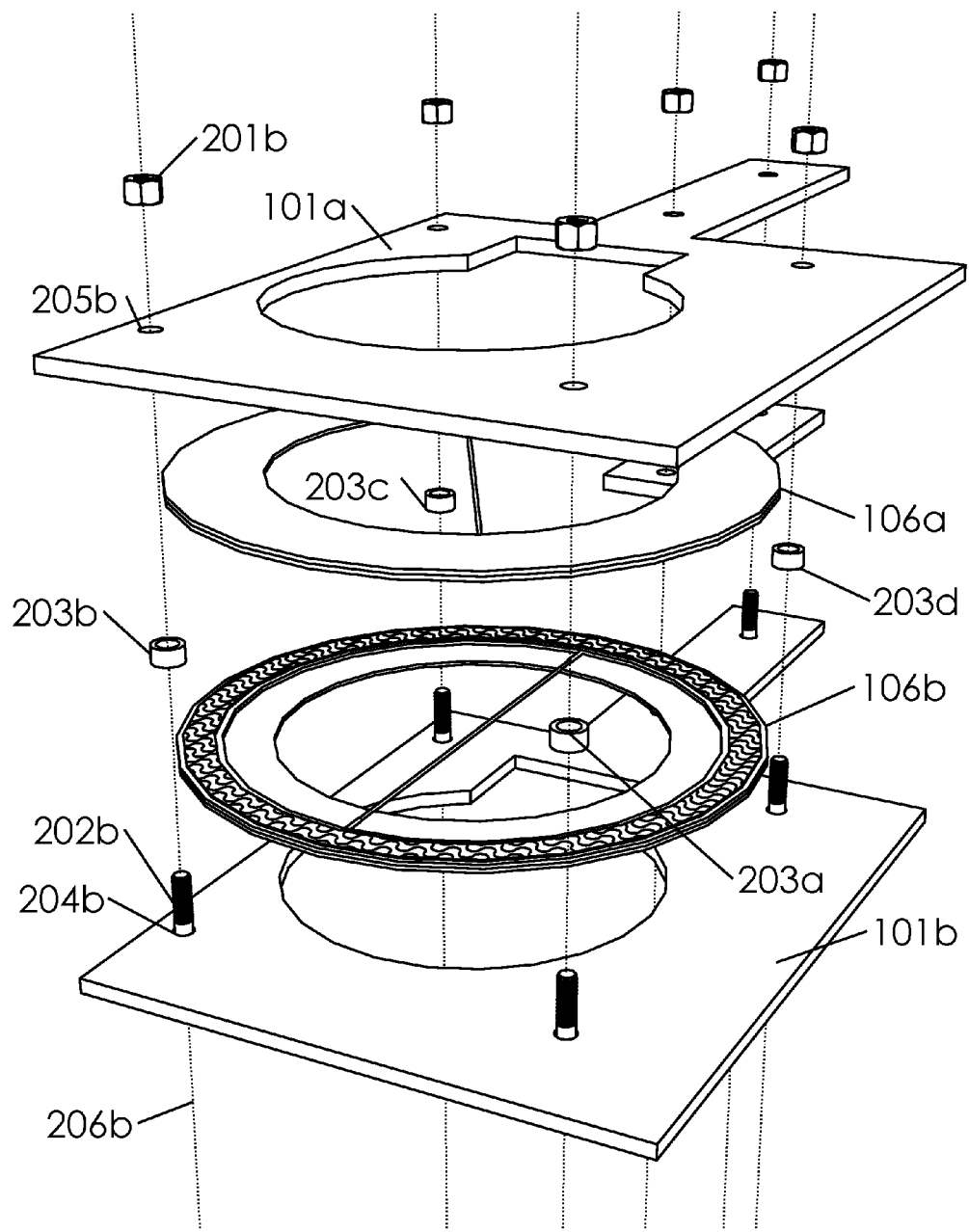
FIGS. 2A, 2B and 2C illustrate a left overview, a right overview, and a side view of angle finder broken apart.

Described herein is a system and method for duplicating angles in nature. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

FIGS. 1A, 1B, 1C and 1D illustrate an overview, a side view, a back view and an end view of angle finder 100. In one embodiment, a system and method for duplicating angles in nature can comprise 100. Angle finder 100 can comprise two plates 101, a grip 102, a body 103, a view window 104, a plurality of adjustable reticles 105, a plurality of disks 106, one or more disk access cuts 107, one or more fastener assemblies 108, and a grip spacer 109. Plates 101 can comprise a first plate 101a and a second plate 101b. In one embodiment, grip 102 can comprise a handle. In one embodiment, grip 102 and body 103 can comprise two distinct portions of plates 101. In one embodiment, body 103 can be substantially rectangular. In one embodiment, view window 104 can comprise a hold in body 103. Adjustable reticles 105 can comprise a first reticle 105a and a second reticle 105b. Disks 106 can comprise a first disk 106a and a second disk 106b. Disk access cut 107 can comprise a first access cut 107a and a second access cut 107b. Fastener assemblies 108 can comprise a first assembly 108a, a second assembly 108b, a third assembly 108c, a fourth assembly 108d, a fifth assembly 108e, and a sixth assembly 108f. In one embodiment, angle finder 100 can comprise view window 104 and a plurality of adjustable reticles 105. In one embodiment, disks 106 can comprise a side portion 110 and a thumb adjustment portion 111, each comprising a portion of disks 106 not covered by plates 101. Thumb adjustment portion 111 can comprise a thumb adjustment portion 111a and a thumb adjustment portion 111b. In one embodiment, thumb adjustment portion 111 can comprise an opening in said plates 101 defined by disk access cut 107. In one embodiment, adjustable reticles 105 can be rotated by rotating disks 106 within thumb adjustment portion 111 or at side portion 110. In one embodiment, adjustable reticles 105 can comprise a cross-point 112 at their intersection with one another. The term "reticle" can comprise a net of fine lines or fibers in view window 104 of side portion 110. The word reticle comes from the Latin "reticulum," meaning "net." There are many variations of reticles. The reticle is said to have been invented by Robert Hooke, and dates to the 17th century. In one embodiment, adjustable reticles 105 can comprise a line, such as a wire, a string, or similar.

Figure 2B:
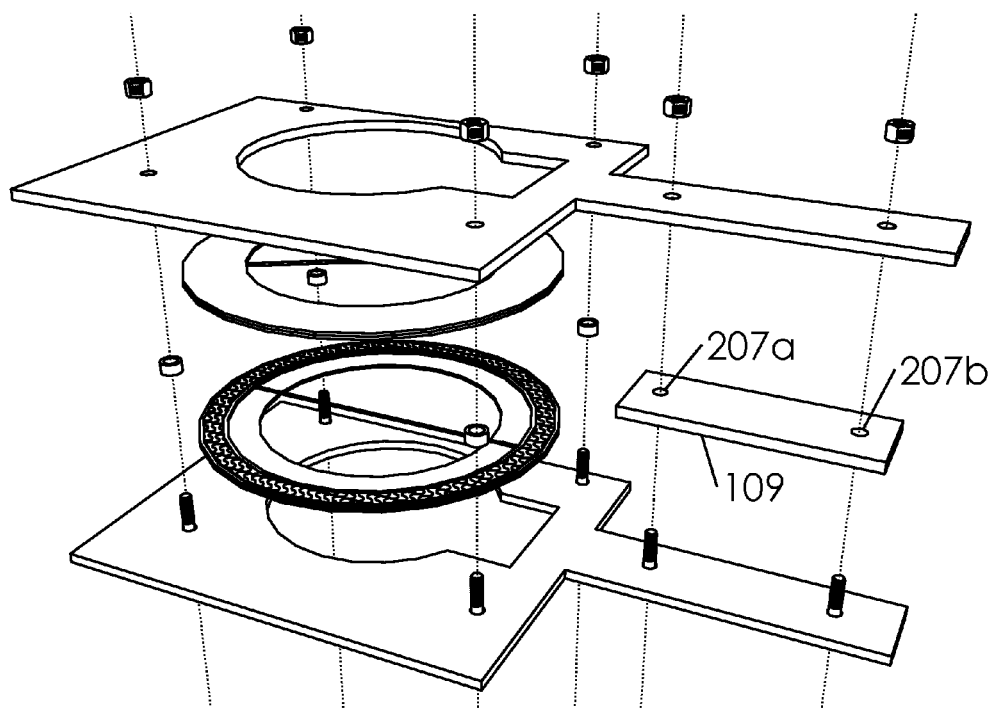
Figure 2C:
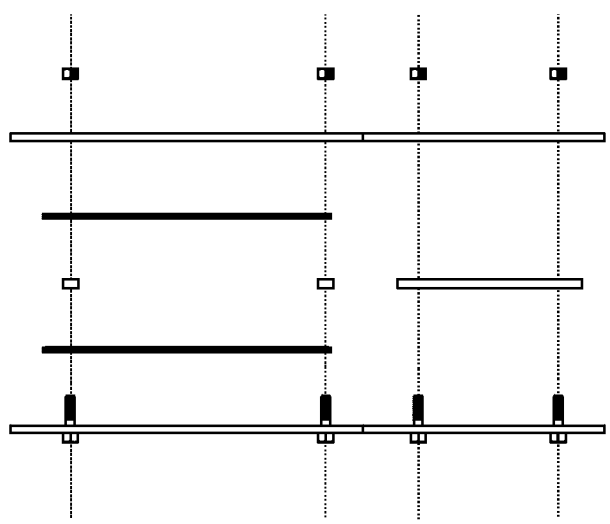

FIGS. 2A, 2B and 2C illustrate a left overview, a right overview, and a side view of angle finder 100 broken apart. In one embodiment, angle finder 100 can be assembled by aligning said disks 106 with one another, aligning said disks 106 with said view windows 104, and fastening said plates 101 around disks 106 with fastener assemblies 108. Fastener assemblies 108 can each comprise a nut 201 and a bolt 202. In one embodiment, angle finder 100 can comprise a plurality of spacers 203. In one embodiment, said spacers 203 can separate first plate 101a from second plate 101b to accommodate disks 106. In one embodiment, fastening said plates 101 around disks 106 with fastener assemblies 108 can comprise: threading each of bolts 202 through a fastener hole 204, spacers 203 and a fastener hole 205; and attaching each of nut 201 to each of bolt 202. In one embodiment, grip spacer 109 can comprise a first hole 207a and a second hole 207b. In one embodiment, grip spacer 109 can be attached between a first grip 102a and a second grip 102b by: threading each of a bolts 202e and 202f through a hole 204e and 204f, then through first hole 207a and second hole 207b, and then through a hole 205e and a sixth hole 205f; attaching a nut 201e to bolt 202e; and attaching a nut 201f to bolt 202f.

Figure 3A:
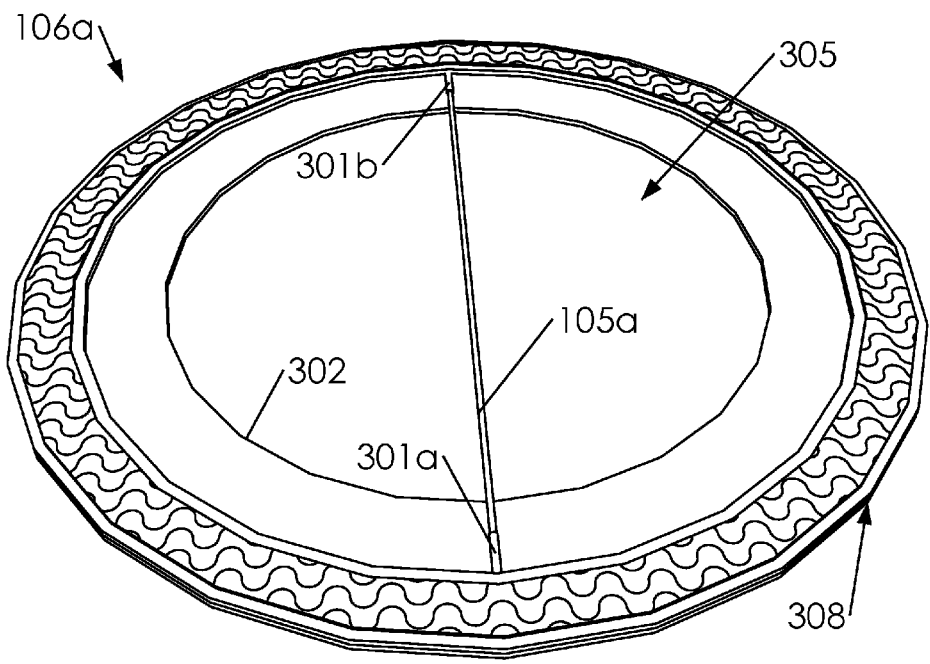
FIGS. 3A and 3B illustrate an overview and detailed view of first disk.
Figure 3B:
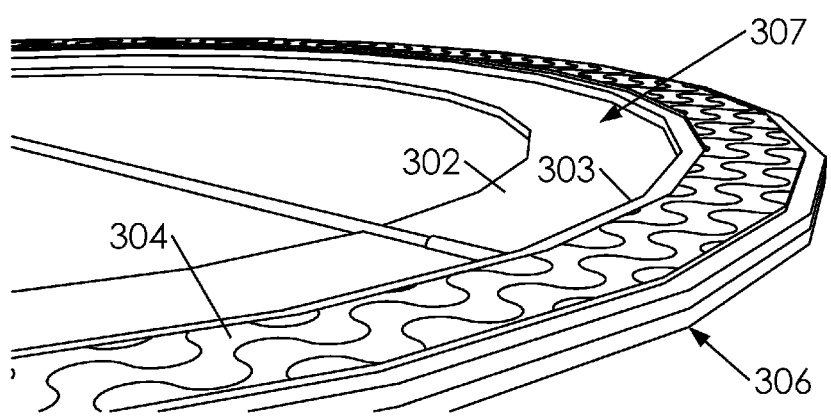

FIGS. 3A and 3B illustrate an overview and detailed view of first disk 106a. Each of adjustable reticles 105 can comprise a first end 301a and a second end 301b. Each of disks 106 can comprise a first ring 302, a second ring 303, and a friction ring 304. Further, each of disks 106 can comprise an open center portion 305, a first side 306, a second side 307, and a perimeter 308. In one embodiment, each of disks 106 can comprise one of adjustable reticles 105. In one embodiment, disks 106 can cross a portion of open center portion 305. In one embodiment, aligning disks 106 can comprise aligning each open center portion 305 and each perimeter 308 of disks 106. In one embodiment, rotating adjustable reticles 105 can comprise rotating disks 106. In one embodiment, disks 106 can be substantially rounded. In one embodiment, aligning disks 106 can comprise: orienting a second side 307a of first disk 106a to face a second side 307b of second disk 106b, and aligning a perimeter 308a of first disk 106a with a perimeter 308b of second disk 106b. In one embodiment, friction ring 304 can be capable of increasing a coefficient of static friction between disks 106. In one embodiment, friction ring 304 can comprise sandpaper, rubber, an adhesive or similar. In one embodiment, said heightened coefficient of static friction can be capable of holding said adjustable reticles 105 in a relative rotary position when a user is not trying to rotate disks 106. In one embodiment, adjustable reticles 105 can attach to disks 106 by attaching first end 301a and second end 301b across open center portion 305 from one another.

Figure 3C:
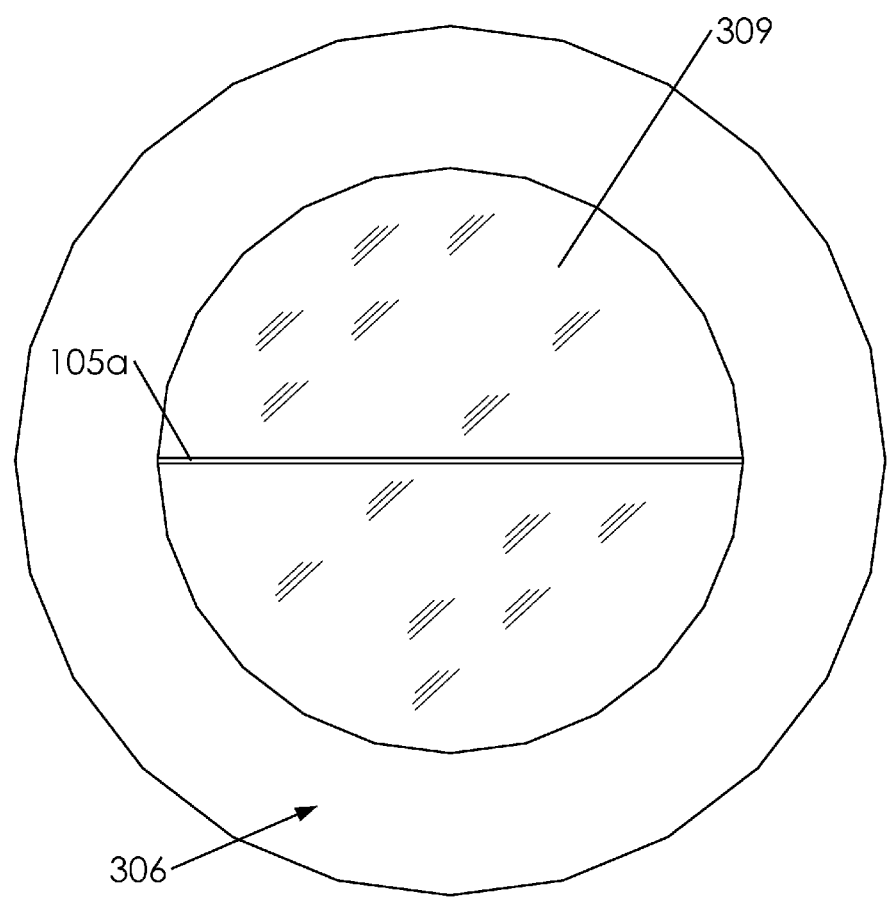
FIG. 3C illustrates a top view of first disk with a transparent pane.
Figure 4A:
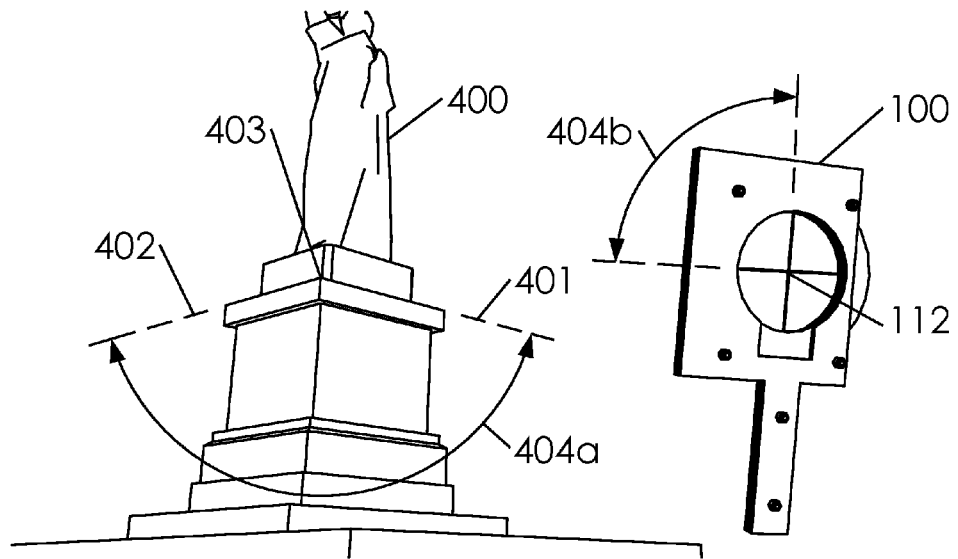
FIGS. 4A, 4B, 4C and 4D illustrate angle finder in use.
Figure 4B:
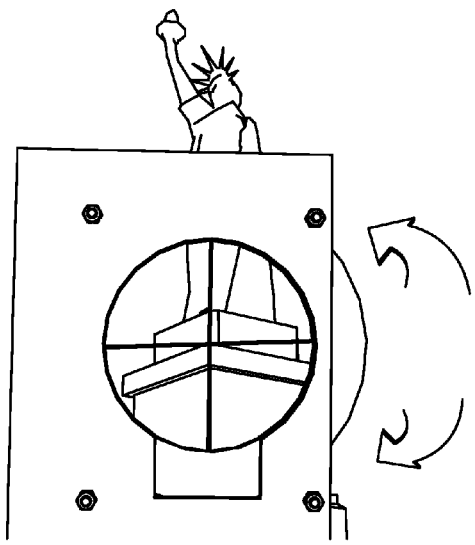
Figure 4C:
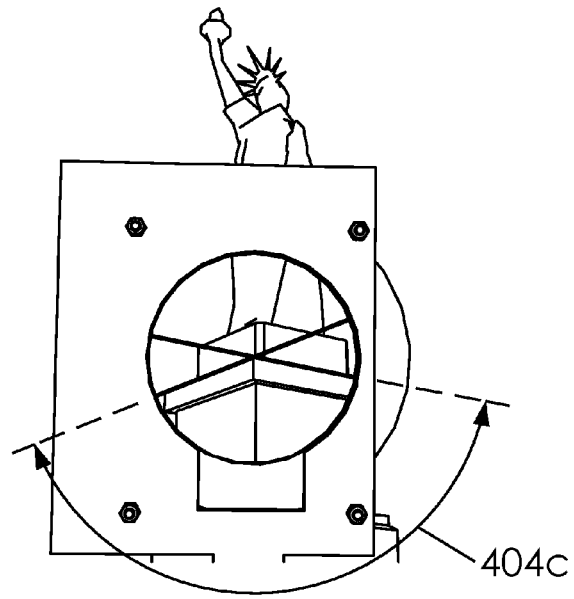
Figure 4D:
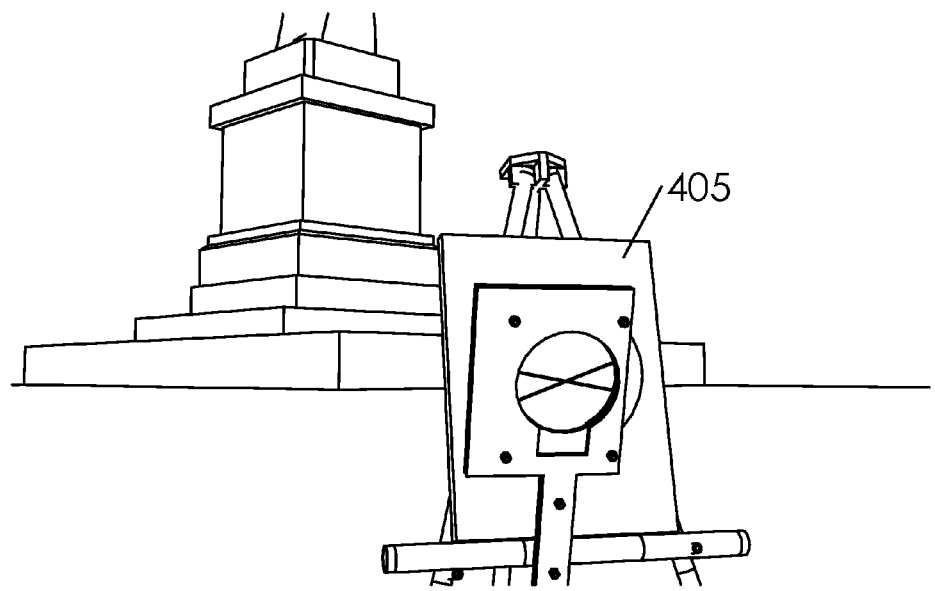

FIG. 3C illustrates a top view of first disk 106a with a transparent pane 309. In one embodiment, disks 106 can comprise transparent pane 309. In one embodiment, transparent pane 309 can be attached in open center portion 305. In one embodiment, adjustable reticles 105 can comprise an embedded fiber, a marking or an engraved line in said transparent pane. In one embodiment, transparent pane 309 can comprise a glass pane or a clear plastic pane.

FIGS. 4A, 4B, 4C and 4D illustrate angle finder 100 in use. In one embodiment, angle finder 100 can be used for matching angles in an object 400. Object 400 can comprise a first line 401, a second line 402, and a vertex 403. In one embodiment, a user of angle finder 100 may wish to match an angle in nature 404a. In one embodiment, angle in nature 404a can comprise an angle in object 400; e.g., angle in nature 404a can comprise an angle 404 originating at vertex 403 and between first line 401 and second line 402. In one embodiment, said plurality of adjustable reticles 105 can comprise a plurality of said angles 404 originating at cross-point 112 and bound by adjustable reticles 105. In one embodiment, adjustable reticles 105 rotate within view window 104 to alter angles 404. In one embodiment, angle finder 100 can be used to match an angle in nature 404a. In one embodiment, adjustable reticles 105 can rotate within view window 104 to alter an initial angle 404b into an aligned angle 404c. In one embodiment, aligned angle 404c can rotate to match angle in nature 404a by: aligning cross-point 112 with vertex 403, and rotating adjustable reticles 105 from initial angle 404b to aligned angle 404c matching angle in nature 404a. In one embodiment, angle finder 100 can be used to transfer said aligned angle 404c to a transfer medium 406.

In one embodiment, said system and method for duplicating angles in nature can comprise a angle finder method comprising: aligning cross-point 112 with vertex 403 of angle in nature 404a; rotating adjustable reticles 105 from initial angle 404b to aligned angle 404c matching angle in nature 404a; and transferring said aligned angle 404c to a transfer medium 405. In one embodiment, transferring said aligned angle 404c to a transfer medium 405 can comprise a user holding said angle finder 100 between transfer medium 405 and said user, aligning cross-point 112 with a point on transfer medium 405 corresponding with vertex 403, and marking transfer medium 405 using adjustable reticles 105 and cross-point 112 as reference points. In one embodiment, rotating adjustable reticles 105 can comprise rotating disks 106 to a plurality of angles 404 between adjustable reticles 105. In one embodiment, aligning disks 106 can comprise orienting second side 307a with second side 307b, and aligning perimeter 308a with perimeter 308b.

FIGS. 5A through 5F illustrate angle finder 100 in use as a proportion finder. In one embodiment, angle finder 100 can be used to establish a set of proportions within a subject 500 based on one or more points 501 on subject 500. Said set of proportions can comprise a height, width, or other points 501.

Figure 5A:
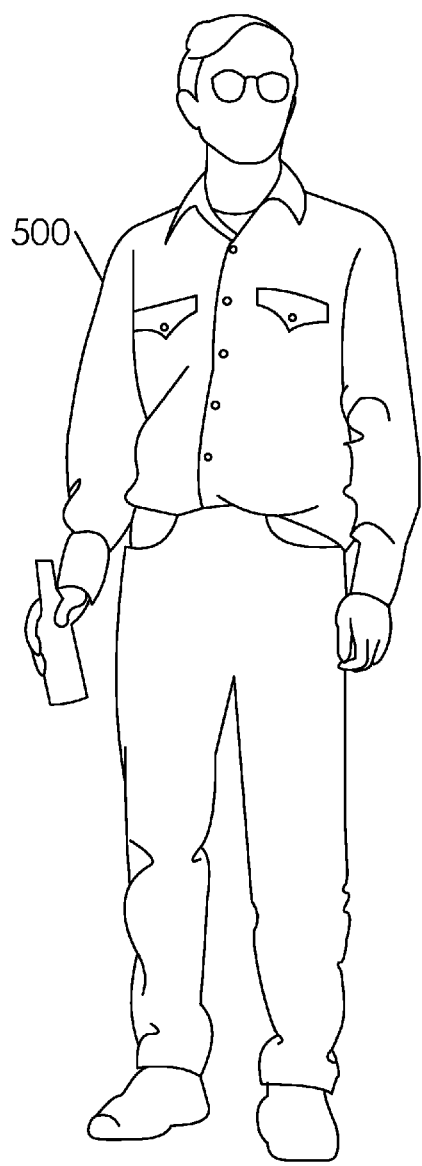

FIG. 5A illustrates subject 500. In one embodiment, subject 500 can comprise a subject matter for a portrait or similar. For illustrative purposes, subject 500 can comprise a person posing for a painted portrait.

Figure 5B:
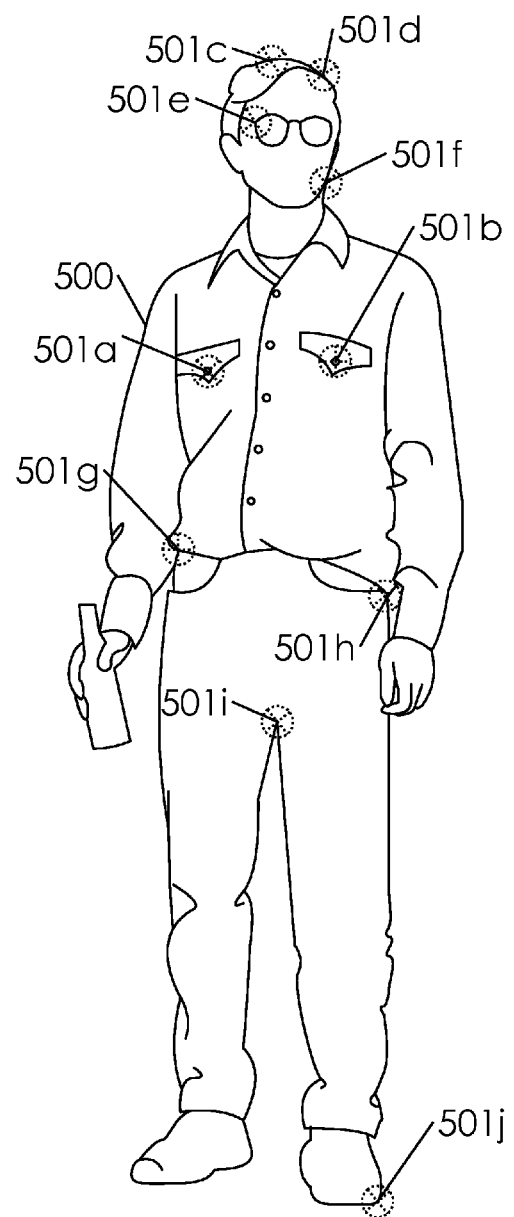

FIG. 5B illustrates points 501 on subject 500. In one embodiment, subject 500 can comprise points 501. In one embodiment, points 501 can comprise a first point 501a, a second point 501b, a first reference point 501c, a point 501d, a intermediate point 501e, a point 501f, a point 501g, a point 501h, a point 501h, a intermediate point 501i and a second reference point 501j. In one embodiment, points 501 can comprise important locations on subject 500 for purposes of painting subject 500. For example, in one embodiment, first point 501a and second point 501b can comprise the locations of buttons on a buttoned-flap patch pocket on a shirt worn by subject 500. In one embodiment, if an artist may desire to transfer the relative locations of a set of points 501 onto transfer medium 405. Accordingly, angle finder 100 can be used for matching proportions as described infra.

FIG. 5C illustrates a horizontal plum line 502a and a vertical plum line 502b. In one embodiment, measuring a relative angle between first point 501a and second point 501b can be established by aligning cross-point 112 over first point 501a, rotating first reticle 105a until it crosses second point 501b, and rotating second reticle 105b until substantially perpendicular to first reticle 105a; wherein, horizontal plum line 502a corresponds with first reticle 105a and vertical plum line 502b corresponds with second reticle 105b. In one embodiment, a plumb line vertex 503 can comprise an intersection between horizontal plum line 502a and vertical plum line 502b. In one embodiment, a user of angle finder 100 can transfer first point 501a, horizontal plum line 502a and vertical plum line 502b to transfer medium 405 by marking transfer medium 405 with at least a portion of said horizontal plum line 502a and said vertical plum line 502b.

FIG. 5D illustrates subject 500 with a first line 504a and a second line 505a about a first vertex 506a. In one embodiment, angle finder 100 can be used to find a relative distance between points 501 (such as, first point 501a, second point 501b, first reference point 501c, and second reference point 501j). For example, in one embodiment, angle finder 100 can establish first line 504a and second line 505a about first vertex 506a by aligning cross-point 112 with first vertex 506a and rotating adjustable reticles 105 into alignment with first line 504a and second line 505a. In one embodiment, first vertex 506a can be aligned on first point 501a, first line 504a can intersect said first reference point 501c, and second line 505a can intersect said second reference point 501j. In one embodiment, first reference point 501c and second reference point 501j can comprise a top and bottom point on subject 500. Further, first line 504a and second line 505b can be used as relative markers for other points 501. For example, in one embodiment, first line 504a can approximately intersect intermediate point 501i, and second line 505a can approximately intersect intermediate point 501e.

Figures 5E, 5F:
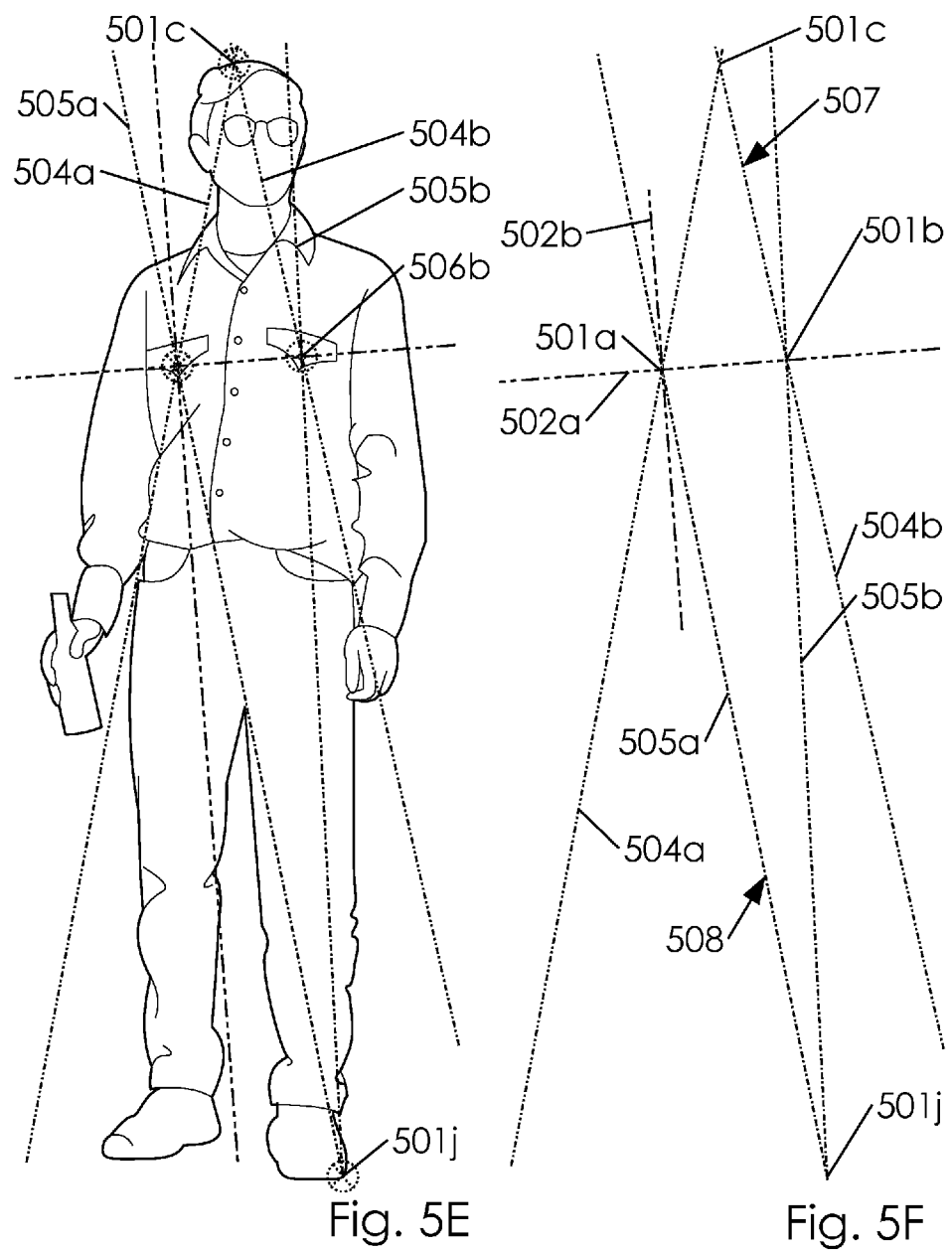

FIG. 5E illustrates subject 500 with a plurality of lines for finding said relative distance between points 501. In one embodiment, angle finder 100 can be further used to find said relative distance between points 501. For example, in one embodiment, angle finder 100 can establish a first line 504b and a second line 505b about a second vertex 506b by aligning second vertex 506b (cross-point 112) over second point 501b, aligning a portion of first reticle 105a (first line 504b) with first reference point 501c, and aligning a portion of second reticle 105b (second line 505b) with second reference point 501j.

FIG. 5F illustrates a view of said plurality of lines for finding said relative distance between said points 501 within subject 500. In one embodiment, said plurality of lines can comprise a portion of horizontal plum line 502a, vertical plum line 502b, first line 504a, first line 504b, second line 505a, and second line 505b. In one embodiment, said plurality of lines can be transferred to transfer medium 405 to establish and/or match proportions of subject 500. In one embodiment, matching one or more proportions of subject 500 can comprise: establishing horizontal plum line 502a, vertical plum line 502b and plumb line vertex 503; selecting a location for first point 501a on transfer medium 405; transferring a portion of horizontal plum line 502a, vertical plum line 502b and plumb line vertex 503 to transfer medium 405; establishing first line 504a, second line 505a and first vertex 506a about first point 501a; aligning first vertex 506a with plumb line vertex 503 on transfer medium 405; transferring a portion of first line 504a, second line 505a, and first vertex 506a to transfer medium 405; establishing a first line 504b, a second line 505b, and a second vertex 506b about second point 501b; establishing a proper proportion of first point 501a, second point 501b, first reference point 501c and second reference point 501j by the placement of second vertex 506b on horizontal plum line 502a on transfer medium 405; and transferring a portion of said first line 504b, second line 505b and second vertex 506b to transfer medium 405.

In one embodiment, said plurality of lines can comprise a first triangle 507 and a second triangle 508. In one embodiment, first triangle 507 can comprise first line 504a, first line 504b, and horizontal plum line 502a intersecting one another at first point 501a, second point 501b, and first reference point 501c. In one embodiment, second triangle 508 can comprise second line 505a, second line 505b, and horizontal plum line 502a intersecting one another at first point 501a, second point 501b and second reference point 501j. In one embodiment, first triangle 507 and second triangle 508 can be used to establish said relative distances and proportions of subject 500 on transfer medium 405.

Figures 5G, 5H:
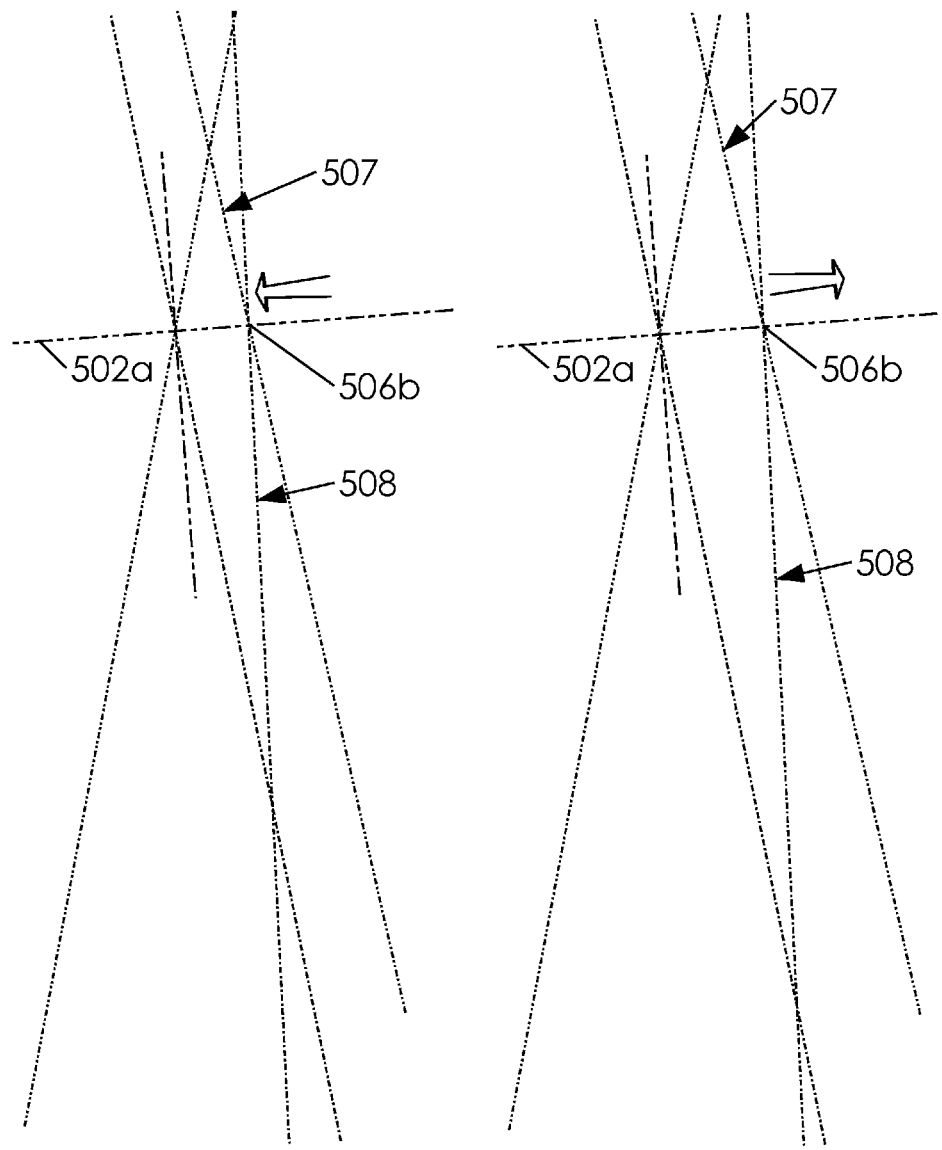
FIGS. 5G and 5H illustrate a means of rescaling first triangle and second triangle.

FIGS. 5G and 5H illustrate a means of rescaling first triangle 507 and second triangle 508. In one embodiment, subject 500 can be transferred to transfer medium 405 in a plurality of relative sizes by adjusting a point at which second vertex 506b intersects horizontal plum line 502a. For example, in one embodiment, first triangle 507 and second triangle 508 will increase and decrease in size proportionately as second vertex 506b is moved further and closer to first vertex 506a, as illustrated in FIGS. 5G and 5H, respectively. That is, once the placement of second vertex 506b is made, then the whole scale of the picture is defined.

Figure 5I:
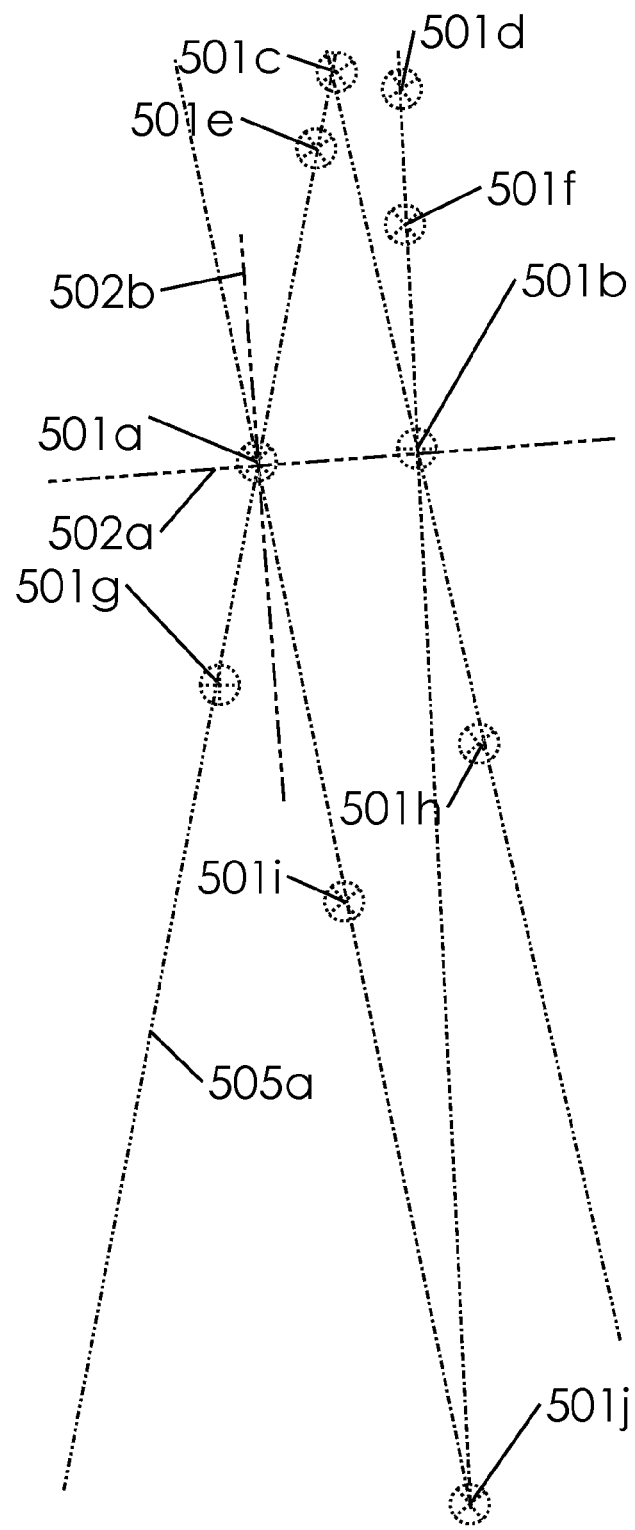
FIG. 5I illustrates points and said plurality of lines.

FIG. 5I illustrates points 501 and said plurality of lines. In one embodiment, once two conveniently established points (such as first point 501a and second point 501b) are established, any other point within subject 500 can be established on transfer medium 405.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An angle finder comprising:
a view window in said angle finder;
a plurality of adjustable reticles within said view window;
a cross-point at an intersection between said plurality of adjustable reticles;
a plurality of angles between said plurality of adjustable reticles originating at said cross-point and bound by said adjustable reticles;
said adjustable reticles rotate within said view window to adjust a portion of said plurality of angles from an initial angle to an aligned angle;
a plurality of disks each having a first side and a second side;
said disks each comprise an open center portion;
said disks each comprise at least one of said adjustable reticles;
said adjustable reticles cross a portion of said open center portion;
said disks are aligned with one another and said open center portions align with said view window;
rotating said adjustable reticles comprises rotating said disks to adjust said plurality of angles between said adjustable reticles; and,
each of said adjustable reticles extend across a portion of said open center portion and attach to said disks with a first end and a second end of said adjustable reticles.

2. The angle finder of claim 1 further comprising matching an angle in an object having a vertex, a first line and a second line by:
aligning said cross-point of said adjustable reticles with said vertex of said angle in said object, and
rotating said adjustable reticles from said initial angle to an aligned angle; wherein,
said aligned angle matches said angle in said object.

3. The angle finder of claim 1 further comprising matching one or more proportions of an object having a plurality of points with said angle finder by:
establishing a plumb line vertex, a horizontal plum line and a vertical plum line with said angle finder by
aligning said cross-point over a first point of said plurality of points and rotating a first reticle to align over a second point of said plurality of points;
selecting a location for said first point on a transfer medium;
transferring a portion of said horizontal plum line, said vertical plum line and said plumb line vertex to said transfer medium;
establishing a first line and a second line about a first vertex by realigning said cross-point over said first point,
aligning a portion of said first reticle over a first reference point, and
aligning a portion of a second reticle over a second reference point;
aligning said first vertex with said plumb line vertex on said transfer medium;
transferring a portion of said first line and said second line about said first vertex to said transfer medium;
establishing a first line and a second line about a second vertex by realigning said cross-point over said second point,
aligning a portion of said first reticle over said first reference point, and
aligning a portion of said second reticle over said second reference point;
establishing a proper proportion of said first point, said second point, said first reference point and said second reference point by transferring said second vertex on said horizontal plum line on said transfer medium; and
transferring a portion of said first line and said second line about said second vertex to said transfer medium; wherein,
said adjustable reticles comprise said first reticle and said second reticle.

4. The angle finder of claim 3 comprising rescaling said first point, said second point, said first reference point and said second reference point by moving said second vertex along said horizontal plum line relative to said first vertex.

5. The angle finder of claim 1 further comprising transferring said aligned angle in said angle finder to a transfer medium by:
holding said angle finder between said transfer medium and a user,
aligning said cross-point with a point on said transfer medium, and
marking said transfer medium using said adjustable reticles and said cross-point as reference points.

6. The angle finder of claim 1 wherein said adjustable reticles comprise a line.

7. The angle finder of claim 1 wherein said adjustable reticles comprise a wire.

8. The angle finder of claim 1 further comprising a plurality of plates; wherein,
said plates comprise a first plate and a second plate,
each of said plates comprise one of said view windows,
each of said plates comprise a grip and a body, and
said disks are held between said plates and aligned with said view window; further wherein,
said disks are capable of rotating between said plates, and
said angle finder can be used one handed by
gripping said angle finder along said grip with a hand and
matching an angle in an object by rotating said plates with one or more digits on said hand.

9. The angle finder of claim 8 wherein at least one of said plates further comprise a disk access cut capable of exposing a portion of said disks; wherein, said adjustable reticles can be rotated by rotating said disks within said disk access cut.

10. The angle finder of claim 9 wherein
at least one of said disks comprises a friction ring and
said friction ring increases a coefficient of static friction between said first disk and said second disk.

11. The angle finder of claim 10 wherein said friction ring comprises sandpaper.

12. The angle finder of claim 8 further comprising a side portion comprising a portion of said disks extend outside of said plates; wherein, said adjustable reticles can be rotated by rotating said disks at said side portion.

13. The angle finder of claim 8 further comprising
a plurality of spacers,
a plurality of fastener assemblies, and
a plurality of fastener holes in said plates; wherein
said fastener assemblies hold said first plate and said second plate together and
said spacers separate said first plate and said second plate to accommodate said disks.

14. The angle finder of claim 1 wherein said disks comprise a first disk and a second disk; further wherein, aligning said disks with one another comprises
orienting a second side of said first disk to face a second side of said second disk and aligning a perimeter of said first disk with a perimeter of said second disk.

15. The angle finder of claim 1 wherein said open center portion comprises a transparent pane.

16. The angle finder of claim 15 wherein said adjustable reticles comprise an embedded fiber in said transparent pane.

17. The angle finder of claim 15 wherein said adjustable reticles comprise an engraved line in said transparent pane.

18. An angle finder comprising:
a view window in said angle finder;
a plurality of adjustable reticles within said view window;
a cross-point at an intersection between said plurality of adjustable reticles;
a plurality of angles between said plurality of adjustable reticles originating at said cross-point and bound by said adjustable reticles;
said adjustable reticles rotate within said view window to adjust a portion of said plurality of angles from an initial angle to an aligned angle;
further comprising matching one or more proportions of an object having a plurality of points with said angle finder by:
establishing a plumb line vertex, a horizontal plum line and a vertical plum line with said angle finder by
aligning said cross-point over a first point of said plurality of points and
rotating a first reticle to align over a second point of said plurality of points;
selecting a location for said first point on a transfer medium;
transferring a portion of said horizontal plum line, said vertical plum line and said plumb line vertex to said transfer medium;
establishing a first line and a second line about a first vertex by realigning said cross-point over said first point,
aligning a portion of said first reticle over a first reference point, and
aligning a portion of a second reticle over a second reference point;
aligning said first vertex with said plumb line vertex on said transfer medium;
transferring a portion of said first line and said second line about said first vertex to said transfer medium;
establishing a first line and a second line about a second vertex by realigning said cross-point over said second point,
aligning a portion of said first reticle over said first reference point, and
aligning a portion of said second reticle over said second reference point;
establishing a proper proportion of said first point, said second point, said first reference point and said second reference point by transferring said second vertex on said horizontal plum line on said transfer medium; and
transferring a portion of said first line and said second line about said second vertex to said transfer medium; wherein,
said adjustable reticles comprise said first reticle and said second reticle.

19. The angle finder of claim 18 comprising rescaling said first point, said second point, said first reference point and said second reference point by moving said second vertex along said horizontal plum line relative to said first vertex.

20. A method of using an angle finder comprising:
matching a one or more proportions of an object having a plurality of points with an angle finder by:
establishing a plumb line vertex, a horizontal plum line and a vertical plum line with said angle finder by
aligning said cross-point over a first point of said plurality of points and
rotating a first reticle to align over a second point of said plurality of points;
selecting a location for said first point on a transfer medium;
transferring a portion of said horizontal plum line, said vertical plum line and said plumb line vertex to said transfer medium;
establishing a first line and a second line about a first vertex by
realigning said cross-point over said first point,
aligning a portion of said first reticle over a first reference point, and
aligning a portion of a second reticle over a second reference point;
aligning said first vertex with said plumb line vertex on said transfer medium;
transferring a portion of said first line and said second line about said first vertex to said transfer medium;
establishing a first line and a second line about a second vertex by
realigning said cross-point over said second point,
aligning a portion of said first reticle over said first reference point, and aligning a portion of said second reticle over said second reference point;

establishing a proper proportion of said first point, said second point, said first reference point and said second reference point by transferring said second vertex on said horizontal plum line on said transfer medium; and transferring a portion of said first line and said second line about said second vertex to said transfer medium; and wherein, said angle finder comprises
- a view window,
- a plurality of adjustable reticles within said view window,
- a cross-point at an intersection between said plurality of adjustable reticles,
- a plurality of angles between said plurality of adjustable reticles originating at said cross-point and bound by said adjustable reticles,
- said adjustable reticles rotate within said view window to adjust a portion of said plurality of angles from an initial angle to an aligned angle; and
- said adjustable reticles comprise said first reticle and said second reticle.

* * * * *